(12) United States Patent
Usmani et al.

(10) Patent No.: US 8,666,854 B2
(45) Date of Patent: Mar. 4, 2014

(54) PROVIDING A UNIFIED VIEW OF CONTRACT REVENUE AND INVOICE DETAILS

(75) Inventors: Aftab Usmani, Newark, CA (US); Sameer Sethi, Fostercity, CA (US); Kiran Mundy, Lexington, MA (US); Perry Unrau, Calgary (CA); Johnson Paulraj, Fremont, CA (US); Vijavanand Rajkumar, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 727 days.

(21) Appl. No.: 12/205,357

(22) Filed: Sep. 5, 2008

(65) Prior Publication Data

US 2010/0063910 A1    Mar. 11, 2010

(51) Int. Cl.
| | | |
|---|---|---|
| G07B 17/00 | (2006.01) | |
| G07F 19/00 | (2006.01) | |
| G06Q 40/00 | (2012.01) | |
| G06Q 40/02 | (2012.01) | |
| G06Q 30/04 | (2012.01) | |
| G06Q 20/10 | (2012.01) | |

(52) U.S. Cl.
CPC .............. G06Q 40/10 (2013.01); G06Q 40/02 (2013.01); G06Q 30/04 (2013.01); G06Q 20/10 (2013.01)
USPC ................... 705/34; 705/30; 705/40; 705/44

(58) Field of Classification Search
CPC ....... G06Q 40/10; G06Q 40/02; G06Q 30/04; G06Q 20/10; G06Q 20/102
USPC ............ 705/16, 14, 9, 80, 34, 29, 40, 30, 64, 705/42, 39, 35; 715/744, 851
See application file for complete search history.

(56) References Cited

U.S. PATENT DOCUMENTS

| | | | | |
|---|---|---|---|---|
| 5,189,606 A | * | 2/1993 | Burns et al. | 705/7.23 |
| 5,625,827 A | * | 4/1997 | Krause et al. | 715/234 |
| 5,907,850 A | * | 5/1999 | Krause et al. | 715/234 |
| 6,324,508 B1 | * | 11/2001 | Finney | 704/246 |
| 6,411,959 B1 | * | 6/2002 | Kelsey | 1/1 |
| 6,658,387 B2 | * | 12/2003 | Finney | 704/270 |
| 6,721,763 B1 | * | 4/2004 | Pekowski et al. | 707/804 |
| 6,922,701 B1 | * | 7/2005 | Ananian et al. | 1/1 |
| 7,283,975 B2 | * | 10/2007 | Broughton | 705/28 |
| 7,321,864 B1 | * | 1/2008 | Gendler | 705/7.15 |
| 7,657,471 B1 | * | 2/2010 | Sankaran et al. | 705/35 |
| 7,664,664 B2 | * | 2/2010 | King et al. | 705/7.28 |

(Continued)

OTHER PUBLICATIONS

NetSuite Software Industry Solution; Software Companies, Website Web Analytics (3 pages); http://www.netsuite.com/portal/industries/software/web_analytics.shtml.

(Continued)

Primary Examiner — Olusegun Goyea
(74) Attorney, Agent, or Firm — Miles & Stockbridge P.C.

(57) ABSTRACT

Systems and methods are provided that provide a unified view of invoice and revenue information for a contract. One embodiment includes receiving a request to display information about a contract, and displaying, in response to the request, a financial summary interface including invoice and revenue information for the contract in the same financial summary interface. The invoice and revenue information for the contract may include contract value, invoiced amount, accrued revenue, and backlog amount.

22 Claims, 6 Drawing Sheets

(56) References Cited

U.S. PATENT DOCUMENTS

| | | | |
|---|---|---|---|
| 7,685,013 B2* | 3/2010 | Gendler | 705/7.23 |
| 7,685,525 B2* | 3/2010 | Kumar et al. | 715/744 |
| 7,720,703 B1* | 5/2010 | Broughton | 705/7.23 |
| 7,725,371 B2* | 5/2010 | Wernze et al. | 705/29 |
| 7,849,438 B1* | 12/2010 | Hemmat et al. | 717/102 |
| 7,853,463 B2* | 12/2010 | Orifici et al. | 705/7.17 |
| 7,865,412 B1* | 1/2011 | Weiss et al. | 705/30 |
| 2001/0037190 A1* | 11/2001 | Jung | 703/1 |
| 2002/0087705 A1* | 7/2002 | Smyth | 709/229 |
| 2002/0178120 A1* | 11/2002 | Reid et al. | 705/59 |
| 2003/0220862 A1* | 11/2003 | Kilgore et al. | 705/36 |
| 2004/0039585 A1* | 2/2004 | Kitamura et al. | 705/1 |
| 2004/0083119 A1* | 4/2004 | Schunder et al. | 705/1 |
| 2004/0098338 A1* | 5/2004 | Uehara et al. | 705/42 |
| 2004/0153382 A1 | 8/2004 | Boccuzzi et al. | |
| 2004/0186763 A1* | 9/2004 | Smith | 705/9 |
| 2004/0205519 A1* | 10/2004 | Chapel et al. | 715/502 |
| 2004/0215572 A1* | 10/2004 | Uehara et al. | 705/64 |
| 2004/0236660 A1* | 11/2004 | Thomas et al. | 705/37 |
| 2004/0243302 A1* | 12/2004 | Barry et al. | 701/204 |
| 2005/0108153 A1* | 5/2005 | Thomas et al. | 705/39 |
| 2005/0177507 A1* | 8/2005 | Bandych et al. | 705/40 |
| 2005/0203718 A1* | 9/2005 | Carek et al. | 703/1 |
| 2005/0261930 A1* | 11/2005 | Litz | 705/1 |
| 2006/0044307 A1* | 3/2006 | Song | 345/419 |
| 2006/0095372 A1* | 5/2006 | Venkatasubramanian et al. | 705/40 |
| 2006/0095373 A1* | 5/2006 | Venkatasubramanian et al. | 705/40 |
| 2006/0111956 A1* | 5/2006 | Whitesage | 705/8 |
| 2006/0150077 A1* | 7/2006 | Sheldon et al. | 715/509 |
| 2006/0184433 A1* | 8/2006 | Gron et al. | 705/30 |
| 2006/0195356 A1* | 8/2006 | Nerenhausen et al. | 705/14 |
| 2006/0206342 A1* | 9/2006 | Shoen et al. | 705/1 |
| 2006/0247987 A1* | 11/2006 | Busch et al. | 705/30 |
| 2006/0253393 A1* | 11/2006 | Bean et al. | 705/40 |
| 2007/0005516 A1* | 1/2007 | Murray et al. | 705/80 |
| 2007/0055597 A1* | 3/2007 | Patel et al. | 705/35 |
| 2007/0094110 A1 | 4/2007 | McCrea | |
| 2007/0094133 A1* | 4/2007 | Anandarao et al. | 705/40 |
| 2007/0192218 A1* | 8/2007 | Licardi et al. | 705/30 |
| 2007/0192677 A1* | 8/2007 | O'Leary | 715/503 |
| 2007/0260532 A1* | 11/2007 | Blake, III | 705/35 |
| 2007/0265962 A1* | 11/2007 | Bowe et al. | 705/40 |
| 2007/0288364 A1* | 12/2007 | Gendler | 705/39 |
| 2008/0027861 A1* | 1/2008 | Gendler | 705/40 |
| 2008/0059325 A1* | 3/2008 | Sugahara et al. | 705/26 |
| 2008/0140451 A1* | 6/2008 | Hedrick et al. | 705/3 |
| 2008/0154755 A1* | 6/2008 | Lamb, III | 705/32 |
| 2008/0177656 A1* | 7/2008 | Sun et al. | 705/39 |
| 2008/0243654 A1* | 10/2008 | Wernze et al. | 705/34 |
| 2008/0249934 A1* | 10/2008 | Purchase et al. | 705/40 |
| 2008/0275798 A1* | 11/2008 | Moduga et al. | 705/34 |
| 2008/0301013 A1* | 12/2008 | Markowski et al. | 705/30 |
| 2008/0306801 A1* | 12/2008 | Musier et al. | 705/8 |
| 2009/0030835 A1* | 1/2009 | Burns et al. | 705/37 |
| 2009/0037297 A1* | 2/2009 | Dixel et al. | 705/27 |
| 2009/0043643 A1* | 2/2009 | Kitamura et al. | 705/10 |
| 2009/0078757 A1* | 3/2009 | Hanson et al. | 235/380 |
| 2009/0089194 A1* | 4/2009 | Mathis et al. | 705/34 |
| 2009/0106079 A1* | 4/2009 | Gutlapalli et al. | 705/9 |
| 2009/0198539 A1* | 8/2009 | Buzz | 705/7 |
| 2009/0216726 A1* | 8/2009 | Muthaiah et al. | 707/3 |
| 2009/0228306 A1* | 9/2009 | Izyayev et al. | 705/4 |
| 2009/0299811 A1* | 12/2009 | Verfuerth et al. | 705/9 |
| 2009/0319421 A1* | 12/2009 | Mathis et al. | 705/40 |
| 2010/0023432 A1* | 1/2010 | Wood | 705/29 |
| 2010/0131331 A1* | 5/2010 | Ginsburg et al. | 705/10 |
| 2010/0268705 A1* | 10/2010 | Douglas et al. | 707/723 |
| 2011/0173050 A1* | 7/2011 | Heyns et al. | 705/7.37 |
| 2012/0060078 A1* | 3/2012 | Beauchamp et al. | 715/201 |
| 2012/0215668 A1* | 8/2012 | Krakowiecki et al. | 705/30 |
| 2012/0221253 A1* | 8/2012 | Hedrick et al. | 702/19 |

OTHER PUBLICATIONS

Upside Contract; enterprise contract management (2 pages); http://www.upsidesoft.com/Upside+Software/Products/UpsideContract.htm.

Softrax Contract Management Software/Manage Complex Transaction Billing, Softrax Solutions; Contract Management (2 page); www.softrax.com/solutions/contract-management/.

Contract Management Software-CLM-Advanced Software Concepts; ASC Contracts (2 pages); http://www.asccontracts.com/products_contracts.html.

Autotask Go!: Overview-Overview, features and benefits; About Autotask Go!; http://www.autotask.com/go/overview.htm.

Procurement Contract Management Software—Emptoris, Inc. (3 pages); http://www.emptoris.com/solutions/procurement_contracts.asp.

Epicor Software: Contract Management System—Epicor Financial and Accounting Software, (2 pages); http://www.epicor.ie/www/products/enterprise/financials/Contract_Management.htm?ExpLeftNavigation1ExpandValue=MainLeft1_ExpLeftNavigation1{6C095A71-52EF-4EBB-9EB6-EEF5AFE8779A.

Khameleon, Contract Management Software (1 page); http://www.khameleonsoftware.com/solutions/contract.php.

Contract Management Software from Metrix; Contract Lifecycle Management (1 page); http://www.metrix.com/solutions/applications/contract_and_warranty_management_software.asp.

\* cited by examiner

CONTRACT: 10034 VERSION 1.2
*INDICATES REQUIRED FIELD

| HEADER | LINES | CONTRACT TERMS |

OVERVIEW
PARTIES AND ACCOUNTS
RISKS
RELATED DOCUMENTS
BILLING
REVENUE
FINANCIAL SUMMARY
DOCUMENTS
SECURITY
GROUPS
HISTORY
INTERACTIONS
CURRENCY CONVERSION
NOTES

200
ECM UI

FINANCIAL SUMMARY 201

ACTIONS ▶ | CANCEL SAVE ▶ SUBMIT
LAST SAVE: APR 9, 2007 11:59 am
☐ CURRENCY KEY

FINANCIAL SUMMARY — CONTRACT TREE 203   AMOUNT 205   INVOICED 207   REVENUE 209   BACKLOG 211   USER STATUS 213

ACTIONS ▼ VIEW ▼

| CONTRACT | BILL METHOD | REVENUE METHOD | AMOUNT | INVOICED | REVENUE | BACKLOG | USER STATUS |
|---|---|---|---|---|---|---|---|
| ☐ CONTRACT 10034 | | | 1000,000.00 | 300,000.00 | 800,000.00 | 200,000.00 | ACTIVE |
| ☐ 1 | | | 800,000.00 | 300,000.00 | 500,000.00 | 300,000.00 | ACTIVE |
| ☐ 1.1 | T&M | %SPENT | 300,000.00 | 100,000.00 | 200,000.00 | 100,000.00 | HOLD |
| ☐ 1.2 | FIXED | AS INCURRED | 500,000.00 | 200,000.00 | 450,000.00 | 50,000.00 | ACTIVE |

☐ LINE 1.2: DETAILS — SUMMARY TAB 217

SUMMARY BY PERIOD   INVOICES — INVOICE TAB 215

SINCE MENU   SINCE   NUMBER OF PERIODS ▼        TRAILING PERIODS [ 6 ]
301          TREND  INCEPTION
                    BEGINNING OF THE CURRENT YEAR
                    BEGINNING OF THE CURRENT QUARTER     REFRESH
                    NUMBER OF PERIODS

BAR GRAPH 303
                                                                    ☐ INVOICE
250,000.00                                                          ☐ REVENUE
200,000.00                                        200,000.00
                                                  180,000.00
150,000.00                              150,000.00
                              120,000.00  110,000.00
100,000.00              80,000.00
 50,000.00    50,000.00
              25,000.00
      0.0
              JAN      FEB       MAR        APR

PROVIDING A UNIFIED VIEW OF CONTRACT REVENUE AND INVOICE DETAILS

FIELD OF THE INVENTION

One embodiment is directed generally to enterprise application systems, and more particularly to contract management.

BACKGROUND INFORMATION

Contract management is a challenge faced by many industries and organizations. In some industries, complex products and/or services may be offered, and these offerings may be associated with complex pricing structures, entitlements, billing and service delivery requirements, and so on. Contracts of varying degrees of complexity and scope may then be created and used for these offerings. These contracts define the relationship between contracting parties in relation to the offerings for specific time periods.

In general, a contract may be drafted to include any number of terms and each term may be drafted to cover any matter of importance between contracting parties. For example, a contract may define certain pricing structure, cover certain services, offer certain preventive maintenance, and so on. For each of these terms, different coverage may be negotiated depending on various factors such as, for example, the parties to the contract, the price paid, and so on. Contracts may thus be viewed as comprising various types of unstructured information.

In many instances, executed contracts (i.e., agreements) need to be serviced to enforce the terms of the contracts. For example, for contracts with installment payment plans (e.g., lease contracts) or recurring charges (e.g., rental contracts), periodic payments need to be determined for the contracts and invoiced accordingly. For a medium or large organization, a large number of contracts may need servicing, the contracts may be of varying degrees of complexity and scope, and numerous payment plans may be called out by the contracts.

The task of generating invoices and tracking revenue for contracts in a manner to meet the needs and requirements of an organization can be challenging. The challenge often magnifies as the complexity and/or the number of contracts to be serviced increases. Thus, techniques that can be used to efficiently service (invoice) contracts are highly desirable.

SUMMARY OF THE INVENTION

One embodiment is a method for providing a unified view of invoice and revenue information for a contract, comprising receiving a request to display information about a contract, and displaying, in response to the request, a financial summary interface including invoice and revenue information for the contract in the same financial summary interface. The invoice and revenue information for the contract may include contract value, invoiced amount, accrued revenue, and backlog amount.

BRIEF DESCRIPTION OF THE DRAWINGS

FIG. 2 is an example financial summary user interface in accordance with an embodiment;

FIG. 3 is another view of the financial summary user interface in accordance with an embodiment;

DETAILED DESCRIPTION

Figure 1:
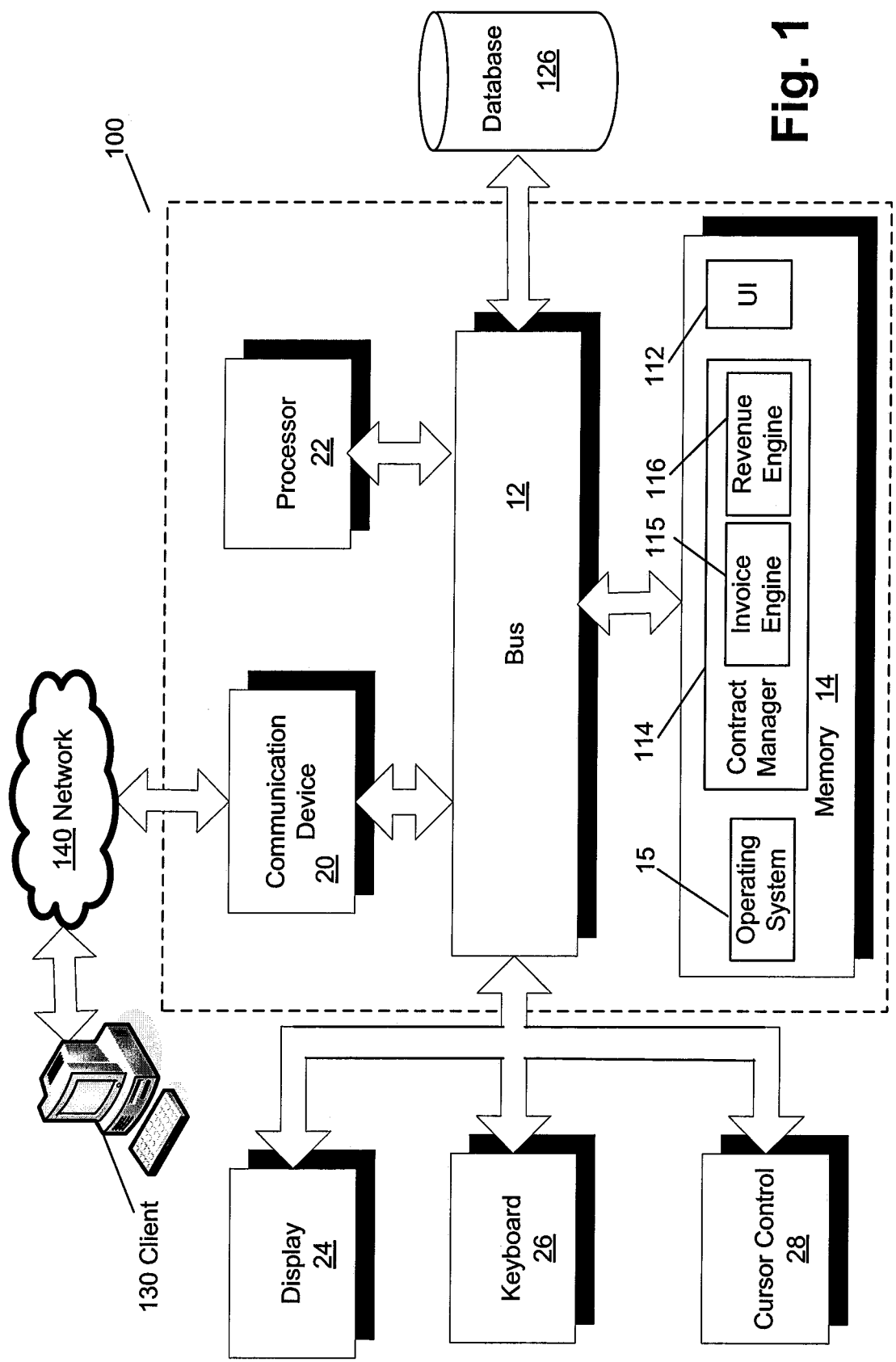
FIG. 1 is a block diagram of an enterprise contract management system in accordance with an embodiment.

An embodiment is directed to an enterprise contract management ("ECM") system that provides a unified view of invoice and revenue information about a contract. FIG. 1 is a block diagram of an ECM system 100 that can implement this embodiment. ECM system 100 includes a bus 12 or other communication mechanism for communicating information, and a processor 22 coupled to bus 12 for processing information. Processor 22 may be any type of general or specific purpose processor. ECM system 100 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. ECM system 100 further includes a communication device 20, such as a network interface card, to provide access to a network. Therefore, a user may interface with ECM system 100 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with ECM system 100.

In one embodiment, memory 14 stores software modules that provide functionality when executed by processor 22. The modules include an operating system 15 that provides operating system functionality for ECM system 100. The modules further include user interface module 112 and a contract manager 114. Additional, fewer, and/or different modules may also be included in ECM system 100. User interface module 112 provides the interface (e.g., screens) used to present information to an administrator and/or an end-user of the ECM system 100. User interface module 112 further receives and interprets user commands and data, which may be provided via mouse clicks, mouse movements, keyboard inputs, and other means. User interface module 112 then provides the received data and commands to other modules, which then perform the appropriate responsive action. A unified ECM database 126, coupled to bus 12, is used to store data for the various system modules. In one embodiment, user interface module 112 and contract manager module 114 are part of the "Oracle E-Business Suite Release 12" ECM system from Oracle Corp. In other embodiments, user interface module 112 and contract manager module 114 may be a stand-alone system and not integrated with an ECM system, or may be part of any other integrated system. In one embodiment, ECM system 100 interacts with one or more client computers 130 via direct connection, a computer network 140 (e.g., the Internet), and/or some other means.

Contract manager 114 facilitates the creation and management of contracts by providing the necessary screens, tools, templates, and data to support the creation of contracts. Contract manager 114 further includes an invoice engine 115 that "services" executed contracts (i.e., agreements), e.g., by automatically generating invoices for these contracts, as described in further detail below. Still further, contract manager 114 includes a revenue engine 116 for collecting, managing, and reporting revenue data related to contracts and associated invoices. The modules within ECM system 100 may operate on and share the contract, invoice, and revenue data stored in a central database 126.

ECM system 100 provides screens and tools to organize and display agreements (i.e., executed contracts) and to efficiently manage agreements. ECM system 100 may be used for numerous industries and organizations. As an example, ECM system 100 may be used for any organizations that provide services, offer rentals, sell products, provide leasing or financing, manage resources, and so on. As used herein, a contract is a document that defines the business relationship between two parties. A contract may be complex and typically describes the obligations to perform, provide, sell, offer, or produce specific activities, responsibilities, products, or services over a determined period of time for a specific amount of money. A contract may cover sales of goods, services, or a combination of both. A contract typically includes detailed descriptions of pricing, terms, limitations, coverage, conditions, legal rights, extension clauses, and other guidelines. A contract can thus include various types of unstructured information. As used herein, an agreement is an executed contract, and the term "contract" may generically refer to either an executed contract (i.e., an agreement) or an unexecuted contract.

The ECM system 100 provides various techniques to facilitate the management of contracts and to automatically generate invoices (e.g., periodically, as scheduled, or when directed) for these contracts. The automatic generation of invoices supports complex pricing structures, which may increase revenue and profitability for an organization while at the same time reduce operational costs.

Figure 2:
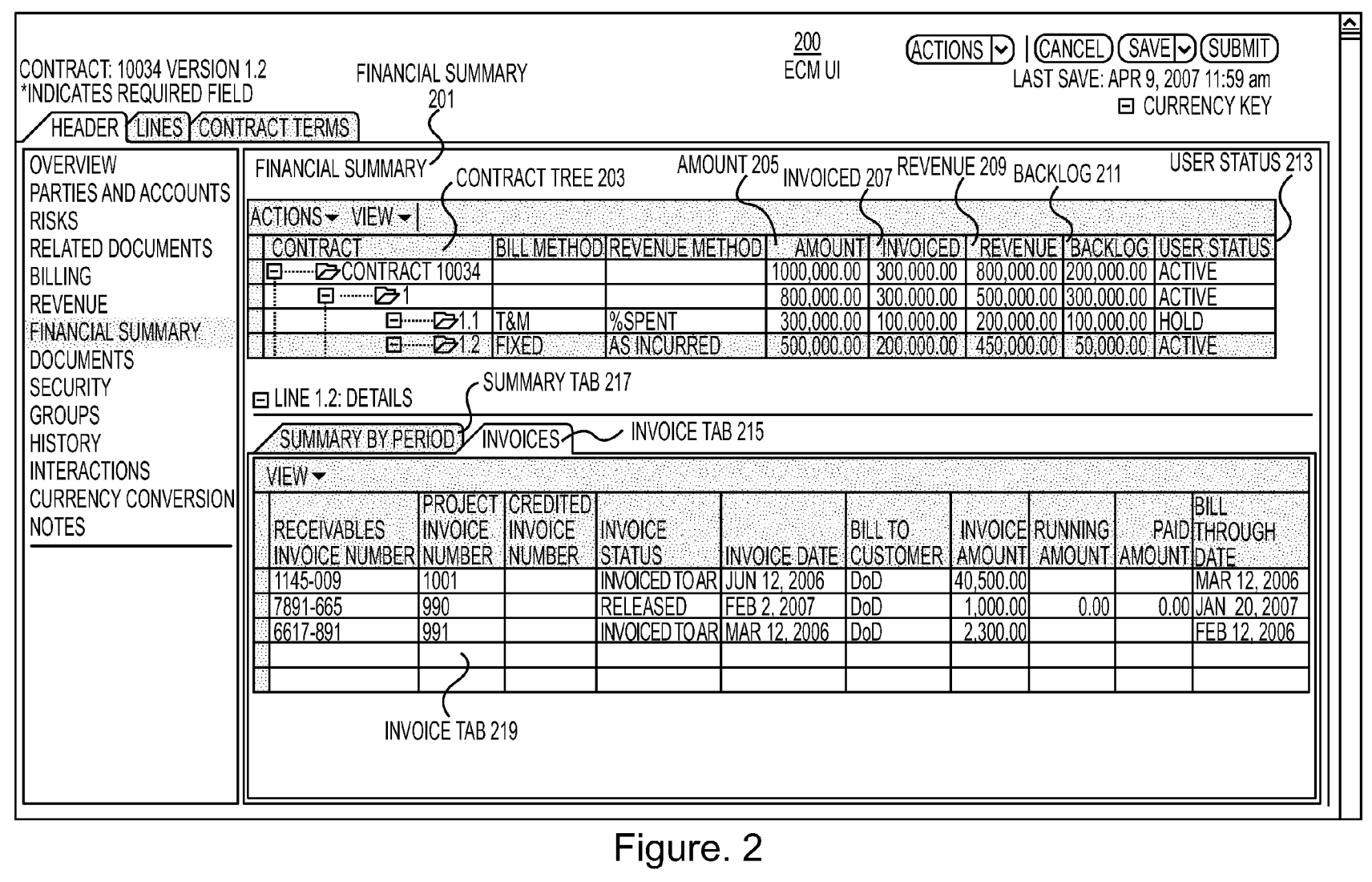

FIG. 2 illustrates an example enterprise contract management user interface ("ECM UI") 300 generated by the user interface module 112 of ECM system 100. User interface module 112 displays information that is collected and utilized by contract manager 114. Specifically, invoice engine 115 and revenue engine 116 supply data to user interface module 112 for displaying a unified view of invoice and revenue data related to a contract. For example, ECM UI 200 includes a financial summary component 201 that provides a user with an integrated view of financial information including contracts, invoices associated with those contracts, and revenue accrued on those contracts. The financial summary component 201 may include a contract tree component 203 illustrating a tree of contracts (e.g., Contract 10034) and their lines (e.g., Line 1.2). A contract line is 'Line Item' on contract which groups a set of deliverable (e.g., items, services, projects, etc.) into a logical set typically defined by price, delivery time, period of validity, or some other classification. A contract usually consists of one or many lines. The financial summary component 201 may further include an amount component 205 indicating the monetary value of the contract, an invoiced component 207 indicating a monetary amount that has been invoiced, a revenue component 209 indicating a monetary amount of revenue accrued for the contract, a backlog component 211 indicating the difference between the contract value and the highest of amount of accrued revenue or invoiced amount, and a user status component 213 indicating whether the contract is active or on hold or in any other status. A contract or its lines may undergo different statuses during its lifecycle starting from 'Draft' and finishing as 'Closed' or 'Expired.' An 'Active' contract is a contract which is legally binding for all parties of the contract at that time. Similarly, 'Hold' status indicates that all parties on contract have agreed to defer the obligations temporarily. A user may manipulate user status component 213 to change the status of the contract from active to on hold and vice versa.

Financial summary component 201 further includes a selectable invoices tab 215 and a selectable summary tab 217. When the invoices tab 215 is selected, financial summary component 201 includes an invoice table 219 that displays details about invoices associated with a selected contract or line. One of ordinary skill in the art will recognize that invoice details could include a wide range of details about the invoice. By way of example and not limitation, such details may include a receivables invoice number, a project invoice number, a credited invoice number, an invoice status indicating whether an invoice has been invoiced or released, an invoice date, a customer to which the invoice was billed, an invoice amount, a running amount, an amount paid on the invoice, and a date through which the invoice has been billed.

Turning attention to FIG. 3, when a summary tab 217 is selected, financial summary component 201 includes a bar graph 303 illustrating an invoiced amount and an accrued revenue amount for the contract over a specified number of periods. For example, bar graph 303 illustrates that in April, $200,000.00 was invoiced, compared to $180,000.00 that was accrued. Drop down 'since' menu 301 allows a user to select a date or milestone from which to view details about invoiced amounts and accrued revenue for the contract. For example, such dates and milestones may include since contract inception, beginning of a current year, beginning of a current quarter, or over a specified number of periods. Accordingly, a user can quickly and easily view a comparison of invoice and revenue information for a contract over a specified amount of time.

Figure 4:
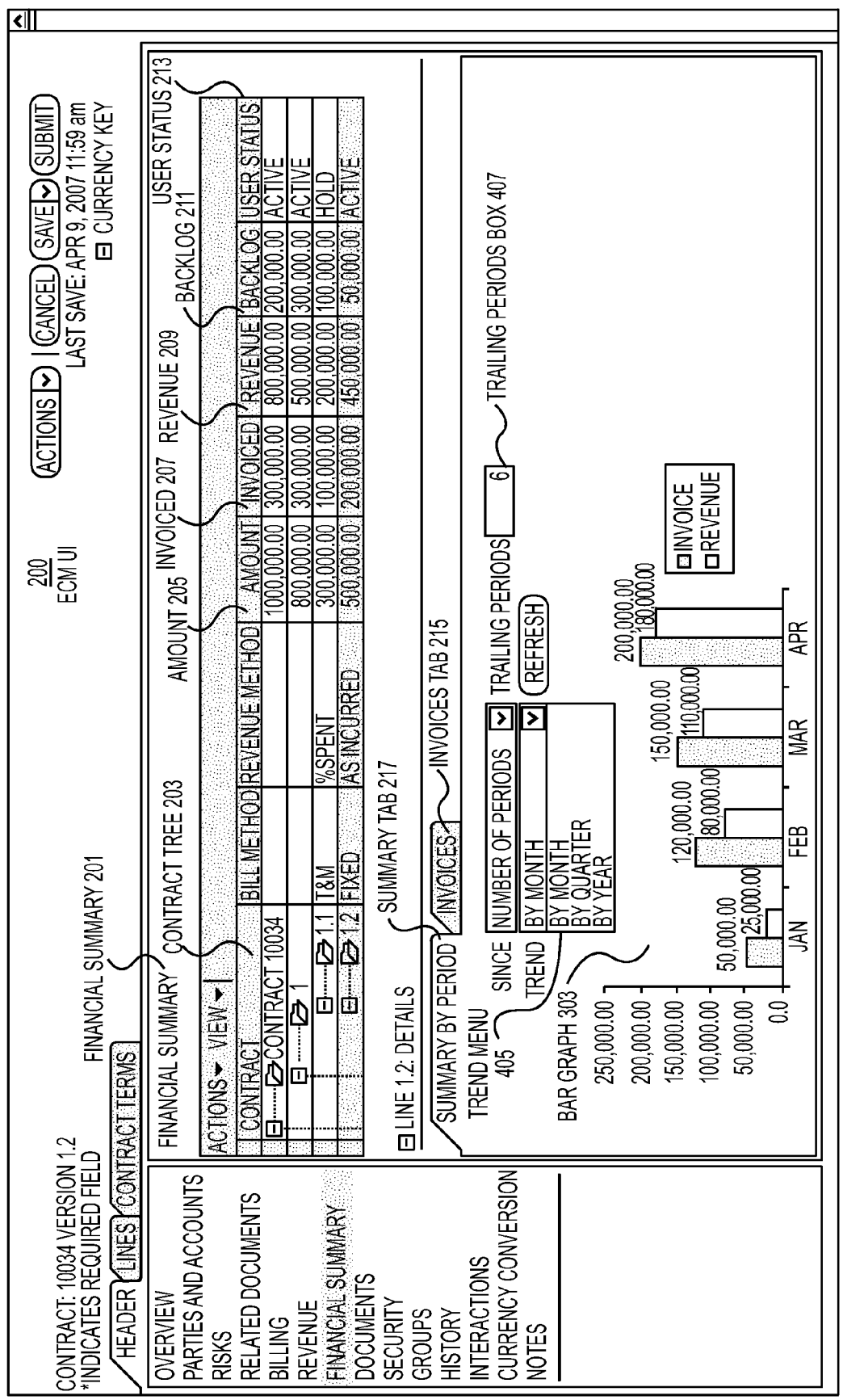
FIG. 4 is yet another view of the financial summary user interface in accordance with an embodiment.

Turning to FIG. 4, a data trend may also be selected using drop down trend menu 405. When drop down since menu 301 is selected to display the data over a number of periods, drop down trend menu 405 allows a user to select the length of period, for example, by month, quarter or year. Trailing periods box 407 allows the user to select the number of trailing periods. One of ordinary skill in the art will recognize that such data may be displayed in various types of graphs, using various types of period trends.

Figure 5:
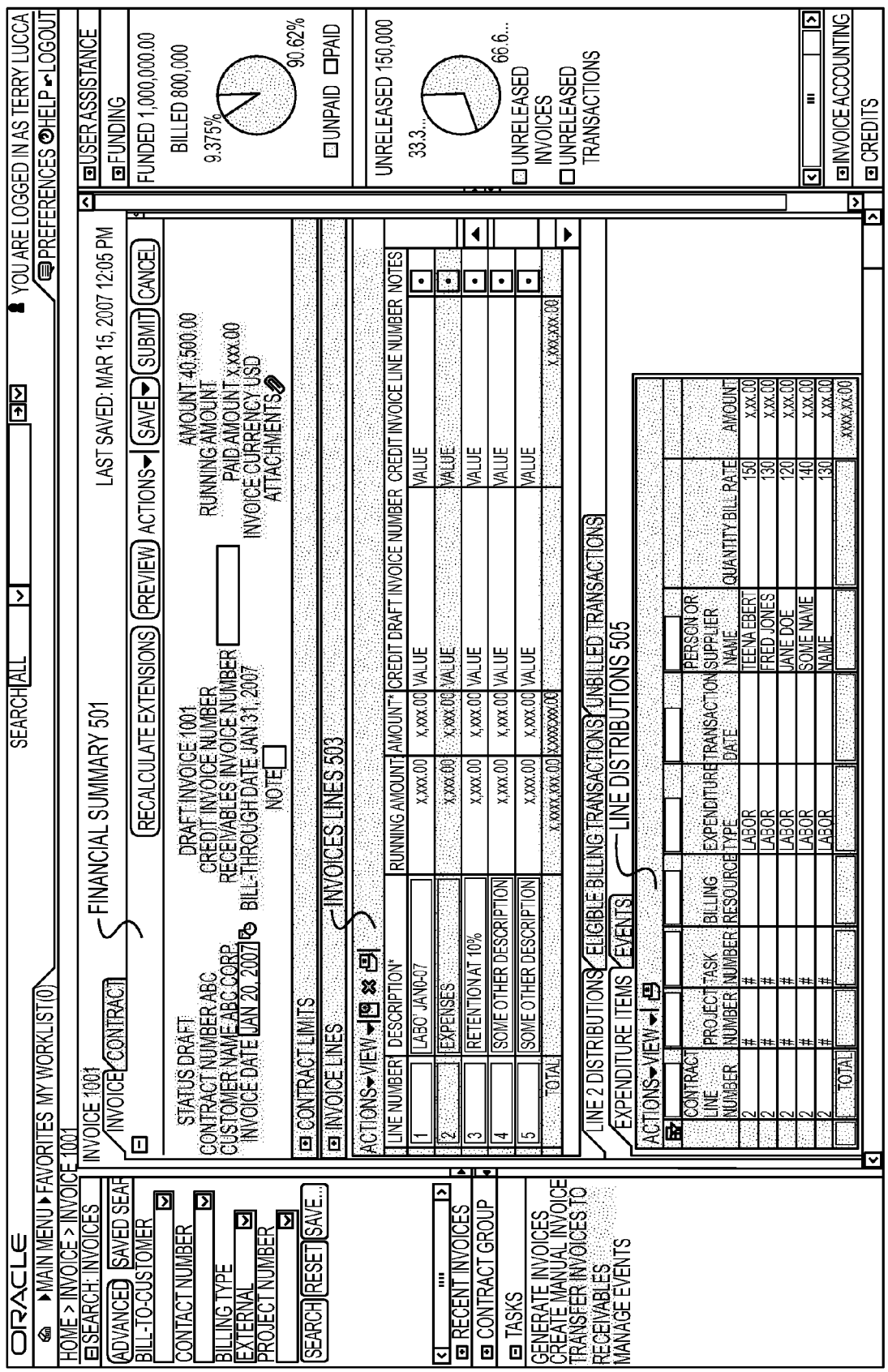
FIG. 5 is an example invoice drilldown user interface in accordance with an embodiment.

Financial summary component 201 further allows a user to move from summary information to more detailed information about an invoice. Such action is sometimes referred to as a drilldown. FIG. 5 illustrates an example drilldown UI 501 of an invoice, for example, invoice 1001. Drilldown UI 501 may include an invoice lines component 503 that contains a line-by-line explanation of the invoice. By way of example and not limitation, the line-by-line description may include a description, a running amount, an invoice amount, a credit draft invoice number, and a credit invoice line number, as well as other notes about the invoice line. An Invoice line is a line item on an invoice. A invoice typically consists of many invoice lines. Drilldown UI 501 may further include a line distributions component 505 that contains detailed information for a selected invoice line, for example, line 2. One of ordinary skill in the art will recognize that there is a wide range of invoice data that could be display in drilldown UI

501. By way of example and not limitation, such invoice data may include the contract line number, a project number, a task number, a billing resource number, an expenditure type (e.g., labor), a transaction date, a person or supplier name, a quantity for goods, a billing rate for labor or professional services, and a total amount.

Figure 6:
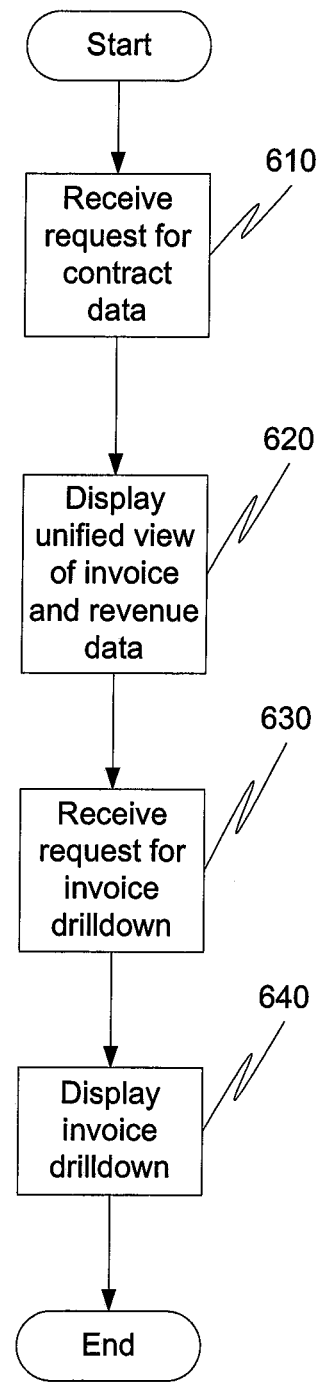
FIG. 6 is a flow chart illustrating a method for providing a unified view of invoice and revenue information for a contract.

FIG. 6 illustrates a flow diagram of the functionality of ECM system 100 accordance with an embodiment when providing a unified view of invoice and revenue information regarding a contract. In one embodiment, the functionality of the flow diagram of FIG. 6 is implemented by software stored in memory and executed by a processor. In other embodiments, the functionality can be performed by hardware, or any combination of hardware and software. ECM system 100 first receives a request to display information regarding a contract, for example, from client computer 130 via network 140 (610). ECM system 100 then responds to that request by displaying a financial summary page for the contract that includes a unified view of invoice and revenue information for the contract (620). The summary page may include information regarding contracts and lines of contracts, contract value, invoiced amount, revenue amount, and a backlog for the contract. The summary page may further include charts depicting amounts invoiced compared to revenue accrued for a contract. The ECM system may then receive a request for details for a particular invoice (630). The ECM system 100 responds by providing a detailed view of the selected invoice (640).

Thus, administrators and billing managers may enter a contract in ECM system 100 and get both approval and signature of the contract. Once the contract is signed of and activated, the delivery of the project or service will start. The customer of the contract will be billed and revenue will be accrued on different lines of contract as per billing and revenue methods of the contract lines. A contract manager or billing administrator may regularly review the financial summary page of contract in order to monitor and track the contract's progress and take decisions based on the information displayed there. The contract manager or billing administrator may easily and quickly determine how much revenue is accruing on a contract, whether the contract is meeting its target, how much has the contract earned in present quarter or month, how is the billing trend for last 'n' quarters or months, what are the backlogs on the contract, and how is collection proceeding for different invoices, among other things.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A method for providing a unified view of invoice and revenue information for a contract, comprising:
   receiving a request to display information about the contract, wherein the contract comprises a plurality of invoices generated over a duration of time occurring in the past;
   determining by a computer an amount of accrued revenue in response to each of the generated invoices, wherein the generated invoices are billed to at least one customer, and the revenue accrues upon payment on each of the generated invoices by the at least one customer; and
   displaying on a user interface display, in response to the request, a financial summary interface comprising, for each of a selectable time period of a plurality of selectable time periods within the duration of time occurring in the past, a total invoice amount and a total accrued revenue amount for the contract that occurred during each of the selectable time periods.

2. The method of claim 1, wherein the total invoice and total accrued revenue amount for the contract include at least one of contract value, invoiced amount, accrued revenue, or backlog amount.

3. The method of claim 1, wherein the financial summary interface allows a user to change a status of the contract to one of active and on hold.

4. The method of claim 1, wherein the financial summary interface includes an invoices component and a summary chart component.

5. The method of claim 4, wherein the invoices component includes information about invoices associated with the contract.

6. The method of claim 4, wherein the summary chart includes a graphical bar chart comparing invoice data and revenue data.

7. The method of claim 6, wherein the summary chart further includes a selectable component that allows a user to select a period for which to display invoice data and revenue data in the chart.

8. The method of claim 1, wherein the financial summary interface provides an invoice drilldown, wherein an invoice interface displays line-by-line information of an invoice.

9. A non-transitory computer-readable medium having instructions stored thereon that, when executed by a processor, cause the processor to provide a unified view of invoice and revenue information for a contract, which comprises:
   receiving a request to display information about the contract, wherein the contract comprises a plurality of invoices generated over a duration of time occurring in the past;
   determining an amount of accrued revenue in response to each of the generated invoices, wherein the generated invoices are billed to at least one customer, and the revenue accrues upon payment on each of the generated invoices by the at least one customer; and
   displaying on a user interface display, in response to the request, a financial summary interface comprising, for each of a selectable time period of a plurality of selectable time periods within the duration of time occurring in the past, a total invoice information and a total accrued revenue information for the contract that occurred during each of the selectable time periods.

10. The computer-readable medium of claim 9, wherein the total invoice and total accrued revenue information for the contract include at least one of contract value, invoiced amount, accrued revenue, or backlog amount.

11. The computer-readable medium of claim 9, wherein the financial summary interface includes an invoices component and a summary chart component.

12. The computer-readable medium of claim 11, wherein the invoices component includes information about invoices associated with the contract.

13. The computer-readable medium of claim 11, wherein the summary chart includes a graphical bar chart comparing invoice data and revenue data.

14. The method of claim 13, wherein the summary chart further includes a selectable component that allows a user to select a period for which to display invoice data and revenue data in the chart.

15. A system for providing a unified view of invoice and revenue information for a contract, comprising:
   a processor;
   a memory coupled to the processor;
   a contract management module stored in the memory and executed by the processor for managing the contract, generating at least one invoice generated over a duration of time occurring in the past, and monitoring accrued revenue;
   a contract database for storing the contract, the at least one invoice, and accrued revenue data, wherein the at least one invoice is billed to at least one customer, and the revenue accrues upon payment on each of the at least one generated invoice by the at least one customer; and
   a user interface module stored in the memory and executed by the processor for generating a financial summary interface comprising, for each of a selectable time period of a plurality of selectable time periods within the duration of time occurring in the past, a total invoice amount and a total accrued revenue amount for the contract that occurred during each of the time periods.

16. The system of claim 15, wherein the financial summary interface displays information regarding at least one of contract value, invoiced amount, accrued revenue, and backlog amount.

17. The system of claim 15, wherein the contract management module includes an invoice engine for managing invoice data and a revenue engine for managing revenue data.

18. A system for providing a unified view of invoice and revenue information for a contract, comprising:
   means for receiving a request to display information about the contract, wherein the contract comprises a plurality of invoices generated over a duration of time occurring in the past;
   means for determining by a computer an amount of accrued revenue in response to each of the generated invoices, wherein the generated invoices are billed to at least one customer, and the revenue accrues upon payment on each of the generated invoices by the at least one customer; and
   means for displaying on a user interface display, in response to the request, a financial summary interface comprising, for each of a selectable time period of a plurality of selectable time periods within the duration of time occurring in the past, a total invoice amount and a total accrued revenue amount information for the contract that occurred during each of the time periods in the same financial summary interface.

19. The system of claim 18, wherein the financial summary interface includes an invoices component and a summary chart component.

20. The system of claim 19, wherein the invoices component includes information about invoices associated with the contract.

21. The system of claim 19, wherein the summary chart includes a graphical bar chart comparing invoice data and revenue data.

22. The system of claim 21, wherein the summary chart further comprises means for selecting a period for which to display invoice data and revenue data in the chart.

* * * * *

UNITED STATES PATENT AND TRADEMARK OFFICE
CERTIFICATE OF CORRECTION

PATENT NO.         : 8,666,854 B2
APPLICATION NO.    : 12/205357
DATED              : March 4, 2014
INVENTOR(S)        : Usmani et al.

Page 1 of 1

It is certified that error appears in the above-identified patent and that said Letters Patent is hereby corrected as shown below:

Title page, item [75] column 1, under Inventors, line 5, delete "Vijavanand" and insert -- Vijayanand --, therefor.

Signed and Sealed this
Eighth Day of July, 2014

Michelle K. Lee
*Deputy Director of the United States Patent and Trademark Office*